(12) United States Patent
Trachtenberg

(10) Patent No.: US 10,958,710 B2
(45) Date of Patent: Mar. 23, 2021

(54) DISPLAY DEVICE REACTIVE TO WIRELESSLY CONNECTED OBJECTS

(71) Applicant: Marc Trachtenberg, New York, NY (US)

(72) Inventor: Marc Trachtenberg, New York, NY (US)

(73) Assignee: Videri Inc., New York, NY (US)

( * ) Notice: Subject to any disclaimer, the term of this patent is extended or adjusted under 35 U.S.C. 154(b) by 0 days.

(21) Appl. No.: 15/360,329

(22) Filed: Nov. 23, 2016

(65) Prior Publication Data

US 2018/0146159 A1 May 24, 2018

(51) Int. Cl.
*H04L 29/08* (2006.01)
*G09G 5/00* (2006.01)
*H04W 4/80* (2018.01)

(52) U.S. Cl.
CPC ............. *H04L 67/10* (2013.01); *G09G 5/003* (2013.01); *G09G 2340/0442* (2013.01); *G09G 2370/04* (2013.01); *G09G 2370/16* (2013.01); *H04W 4/80* (2018.02)

(58) Field of Classification Search
CPC ...... H04N 7/0122; H04L 67/10; H04W 4/008
USPC ........ 725/62, 95; 709/219; 705/39; 235/375, 235/451; 325/45
See application file for complete search history.

(56) References Cited

U.S. PATENT DOCUMENTS

| | | | | |
|---|---|---|---|---|
| 6,714,253 | B2 * | 3/2004 | Kim ..................... | H04N 5/4401 348/554 |
| 8,002,637 | B1 * | 8/2011 | Mitchell ................. | G07F 17/32 273/138.1 |
| 9,497,572 | B2 * | 11/2016 | Britt ......................... | G06F 8/36 |
| 10,447,748 | B2 * | 10/2019 | Bendahan ................ | G06F 8/36 |
| 2005/0082367 | A1 * | 4/2005 | Jalkanen .............. | G06Q 20/203 235/451 |
| 2006/0007169 | A1 * | 1/2006 | Robbins ................ | G06F 3/0224 345/173 |
| 2006/0033720 | A1 * | 2/2006 | Robbins ................ | G06F 1/1607 345/173 |
| 2013/0098988 | A1 * | 4/2013 | Ben-Haim ............. | G06Q 10/00 235/375 |
| 2013/0312042 | A1 * | 11/2013 | Shaw ............... | H04N 21/23439 725/62 |
| 2014/0055367 | A1 * | 2/2014 | Dearman .............. | G06F 3/0488 345/173 |
| 2015/0115030 | A1 * | 4/2015 | Nguyen ................. | H01Q 9/065 235/439 |
| 2015/0333951 | A1 * | 11/2015 | Yeom ................ | H04L 29/08954 725/95 |
| 2016/0063474 | A1 * | 3/2016 | Spencer, II .......... | G06Q 20/322 705/39 |
| 2016/0147506 | A1 * | 5/2016 | Britt ......................... | G06F 8/36 717/107 |
| 2016/0150021 | A1 * | 5/2016 | Britt ........................ | H04W 4/70 709/219 |

(Continued)

*Primary Examiner* — Michael E Teitelbaum
*Assistant Examiner* — Sean N. Haiem
(74) *Attorney, Agent, or Firm* — Pryor Cashman LLP

(57) ABSTRACT

A system for adjusting the display of a digital display device comprising a digital display device including a display, a receiver, and a display controller, an object having a communication device that wirelessly communicates with the receiver, wherein the display controller automatically adjusts the display of the digital display device based on the communication.

6 Claims, 4 Drawing Sheets

(56) References Cited

U.S. PATENT DOCUMENTS

2016/0277879 A1* 9/2016 Daoura ................ H04W 4/008
2017/0265021 A1* 9/2017 Desdier ................ H04W 4/008
2017/0331869 A1* 11/2017 Bendahan ............... H04L 65/60

* cited by examiner

DISPLAY DEVICE REACTIVE TO WIRELESSLY CONNECTED OBJECTS

FIELD OF THE INVENTION

The present invention is a digital display device that automatically adjusts displayed content based on input received from wirelessly connected objects.

BACKGROUND

Digital display devices such as LCD or OLED displays include a display surface with dimensions dictated by two main factors: (1) video standards and (2) optimization of the "mother" glass pane at factory. Currently, the market is dominated by 16:9 aspect ratio glass, thus making it difficult to display images and videos that are of formats other than 16:9 or 9:16. Displays present non-16:9 visual content by cropping the visible portion of the image or video to a 16:9 ratio or letter-boxing the content to preserve its entirety. These mechanisms are clearly insufficient to preserve content integrity and modify the effective aspect ratio of the display.

SUMMARY OF THE INVENTION

It is an object of the present invention to provide a system for adjusting the visible display area of a digital display device comprising a digital display device including a display, a receiver, and a display controller, an object having a communication device that wirelessly communicates with the receiver, and wherein the display controller automatically adjusts the image displayed on the digital display device based on the communication.

Implementations of the invention include one or more of the following features. The digital display device is connected to a cloud for communication. The communication device is a NFC tag, RFID tag, or a Bluetooth device. The said object is a physical frame having a visible aspect ratio and the display is adapted so that an effective ratio of the display matches the aspect ratio of the physical frame. The object is a consumer product and the displayed image is adjusted to react to the proximity of the consumer product by displaying, for example, a promotional message. The image being displayed is adjusted to optimize the display attributes of the display device. The display is adjusted to display a specific image, video, app or combination of images, videos and apps.

DETAILED DESCRIPTION

Figure 1:
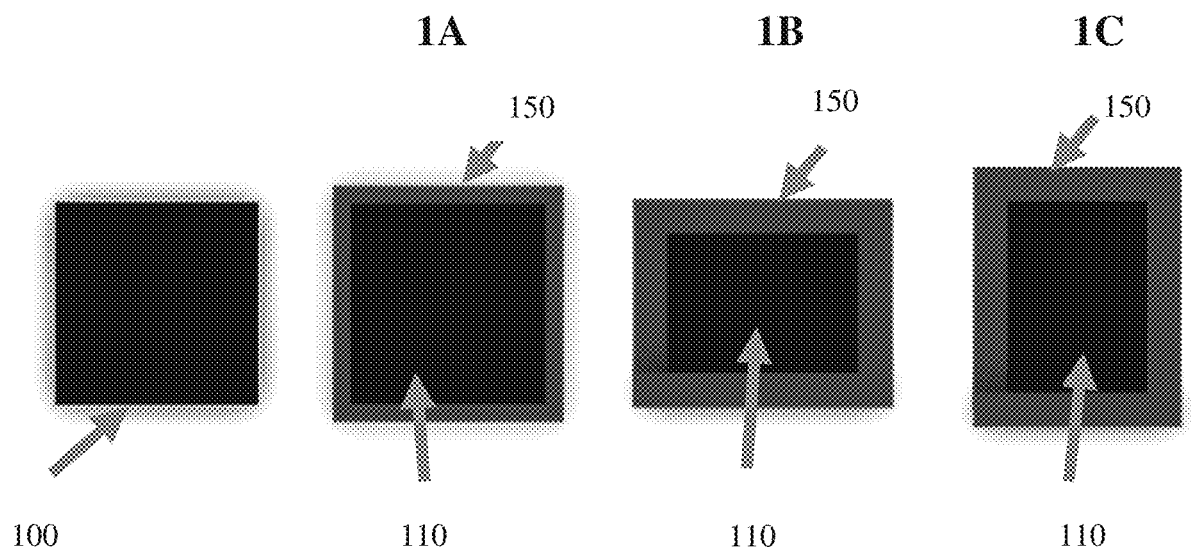
FIG. 1 shows a digital display device alone and with various size physical frames that alter the size of the visible display area of the digital display device according to one embodiment of the present invention.

The present invention concerns a digital display device that preserves content integrity and maximizes display attributes for a better and more relevant viewing experience. A display device 100 is equipped with a radio frequency receiver 300 that can recognize and receive information from a tag 150 embedded in an object. Tags herein refers to any suitable wireless communication mechanism, including RFID tags, NFC tags, or Bluetooth communication devices. The tag embedded object may be a number of objects with multiple purposes.

The tagging and detection of a specific object may be accomplished using RFID or NFC or Bluetooth technology, for example, or any other point-to-point wireless communication technology. An active tag is embedded in an object 200 (e.g. a frame) and programmed or encoded to define the specific characteristics of the object or expect response to proximity of the object. The receiver 300 reads the information provided by the tag or emitter and transfers this information to the display controller 400 of the digital display device 100. The display controller 400 uses this information either stand-alone or in collaboration with a cloud to determine the response to the tag detection. The response can either be an immediate display response or another trigger to an accessory or an object connected to the cloud. For example, a tag or transmitter embedded in a frame may refer to its physical characteristics such as shape, size, texture, material, composition and color. The tag may also contain additional data such as ideal brightness and contrast settings, and the display device may react by adjusting a number of display parameters to enhance how content is presented on the display surface.

Thus, in practice, if a user mounts a tag embedded physical frame 200 over the display device 100, the display device 100 can automatically adjust its display attributes to optimize the presentation of content based on the frame.

Figure 2:
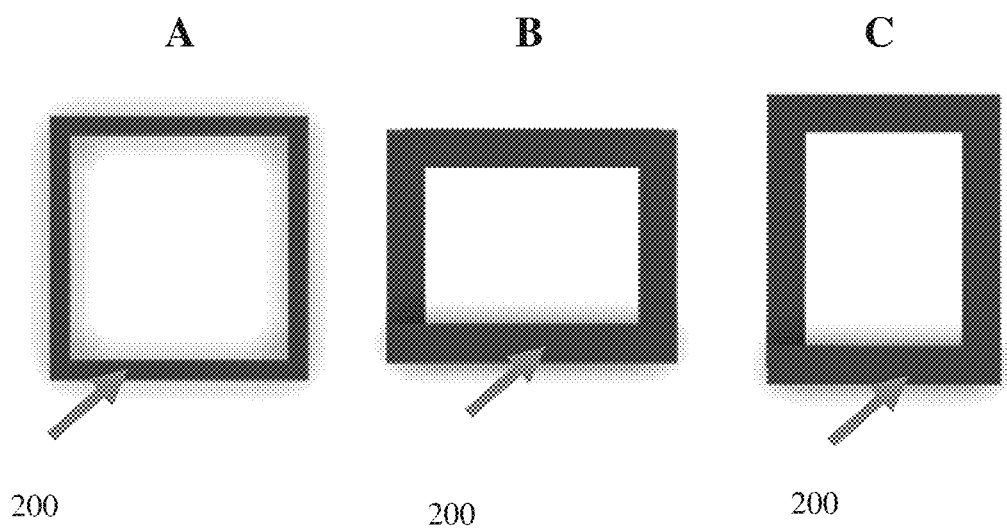
FIG. 2 shows various sized physical frames for one digital display device.
Figure 3:
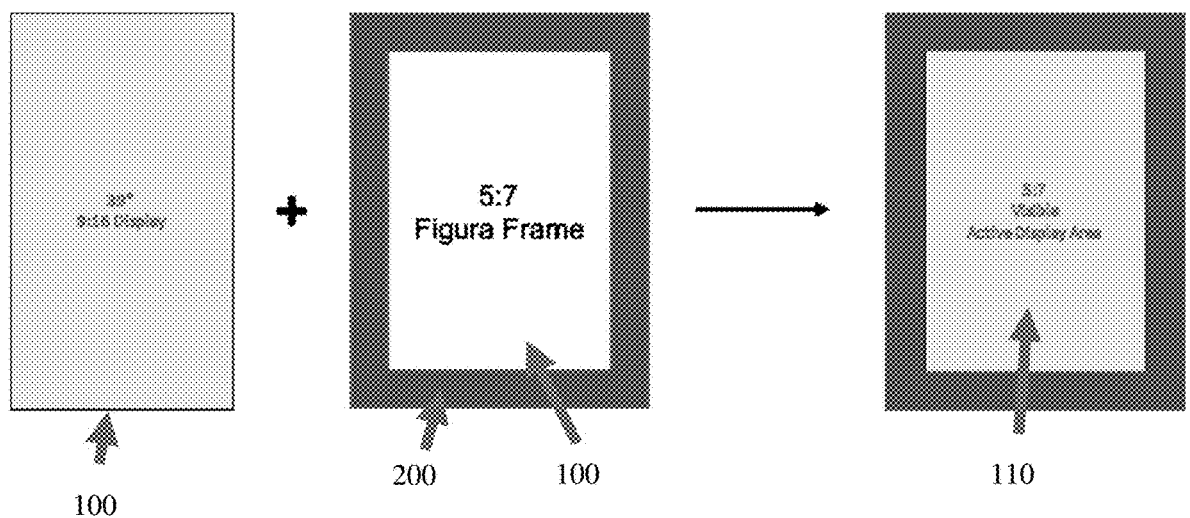
FIG. 3 illustrates the change in aspect ratio of a thirty-nine inch digital display device with a frame mounted thereon from 9:16 to 5:7.
Figure 4:
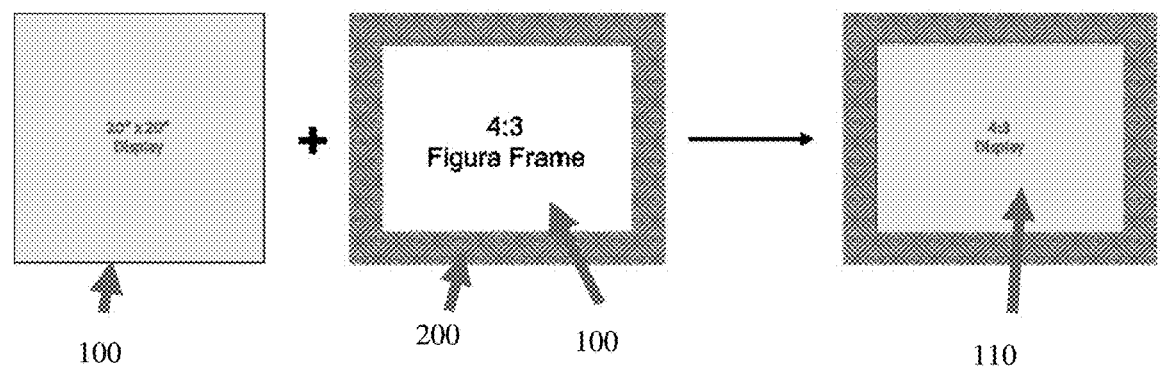
FIG. 4 illustrates the change in aspect ratio of a twenty by twenty inch digital display device with a frame mounted thereon from 1:1 to 4:3.

In one embodiment of the invention, as shown in FIG. 1, the tag or transmitter embedded object 150 is a physical frame 200 for the display device with a tag or transmitter embedded in a wall of the frame. The information provided by the tag or transmitter my refer to the dimensions and visible area inside the frame. Frames with different aspect ratio (A, B and C in FIG. 2) mounted on the digital display device change the visible area of the display (i.e., 1A, 1B and 1C in FIG. 1) by covering a certain portion 110 of the visible display surface of the display device, hence modifying its native aspect ratio. For example, a 37" wide frame overlapping the top and bottom but not the sides of a standard 39" (9:16 Vertical) display device will expose a 5:7 active display area of the display device, as shown in FIG. 3. Similarly, a 25" wide frame overlapping the sides but not the top and bottom of a standard 20"×20" square display will expose a 3:4 active display area on the display device, as seen in FIG. 4. By designing the dimensions of a physical frame to overlap a portion of the visible display area of a standard display, one can effectively modify the effective visible display aspect ratio to match a desired alternative aspect ratio, such as, for example, traditional picture aspect ratios (3:5, 4:6, 5:7, A1, A2, etc. . . . ).

Figure 5:
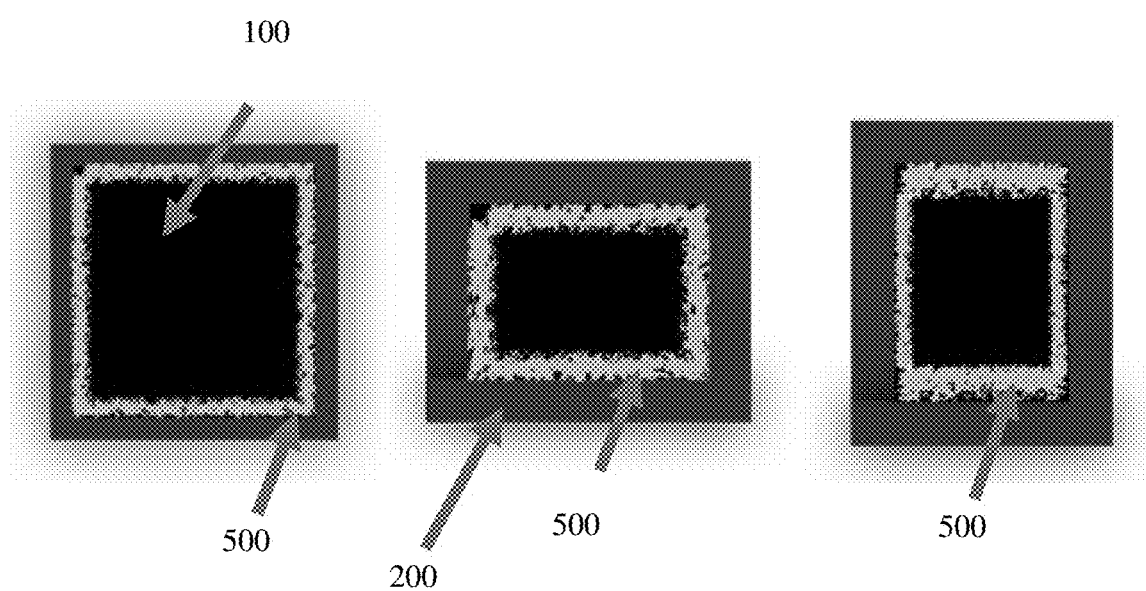
FIG. 5 illustrates various physical frames mounted on a digital display device activating corresponding digital mats.
Figure 6:
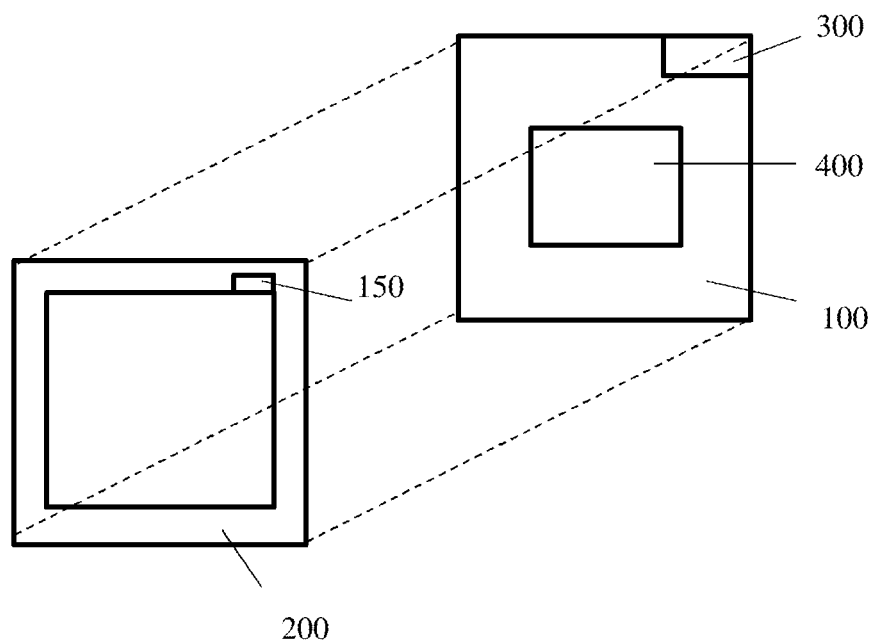
FIG. 6 shows an exploded view of the digital display device.

In other embodiments of the invented tagged physical frame 200, the tag contains or refers to data regarding the appearance of the frame (e.g. material, color, texture, pattern) to select content (picture or video) that better matches the style of the physical frame. For example, pictures with shades of yellow and red to match a red frame, a Renaissance artist painting to match a Louis XIV-style frame, displaying a digital mat 500 around a picture to enhance the physical attributes of a physical frame, as seen in FIG. 5, or other content parameters that can be influenced by the shape, size, texture, material, composition and color of a physical frame.

The tagged object 150 need not be an accessory of the display device. In another embodiment, the tagged object may be included in a consumer product such as a soda can. As described above, a tag or transmitter compatible with a receiver 300 in the display device 100 will be embedded in the object 150. The tag may carry or refer to information regarding the object. When a user brings the tagged object 150, in this case a soda can, near the display device 100, the display controller will adjust the displayed content accordingly to present information or graphics elements relevant to the object including, but not limited to hints, giveaways, contests, promotions, or new products.

The embodiments and examples above are illustrative, and many variations can be introduced to them without departing from the spirit of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there is illustrated a preferred embodiment of the invention.

What is claimed is:

1. A system for adjusting the displayed images of a digital display device comprising:
    a digital display device including a display, a radio frequency receiver, and a display controller; and
    a physical frame configured for mounting to the digital display device and embedded with a communication device that wirelessly communicates with the radio frequency receiver, said physical frame having a visible aspect ratio that is different from a visible aspect ratio of the display of the digital display device;
   wherein the communication device is an active transmitter;
   wherein, upon mounting of the physical frame to the digital display device, the radio frequency receiver receives stored information from the communication device and transfers the stored information to the display controller, the stored information including dimensions and visible area within the physical frame, brightness settings, and contrast settings, and the display controller automatically adjusts the display of the digital display device based on the stored information from the communication device of the physical frame, received and transferred by the radio frequency receiver, to match an effective aspect ratio of the display to the visible aspect ratio of the physical frame and to adjust a brightness and/or a contrast setting of the display.

2. A system as claimed in claim 1 wherein the digital display device is connected to a cloud for communication.

3. A system as claimed in claim 1 wherein said communication device is a NFC tag, RFID tag, or a Bluetooth device.

4. A system as claimed in claim 1 wherein the display is adjusted to optimize the display settings of the display device.

5. A system as claimed in claim 1 wherein the display is adjusted to display a specific image.

6. A system as claimed in claim 1 wherein the display is adjusted to add graphics elements to enhance viewing experience.

* * * * *